Figure 1:
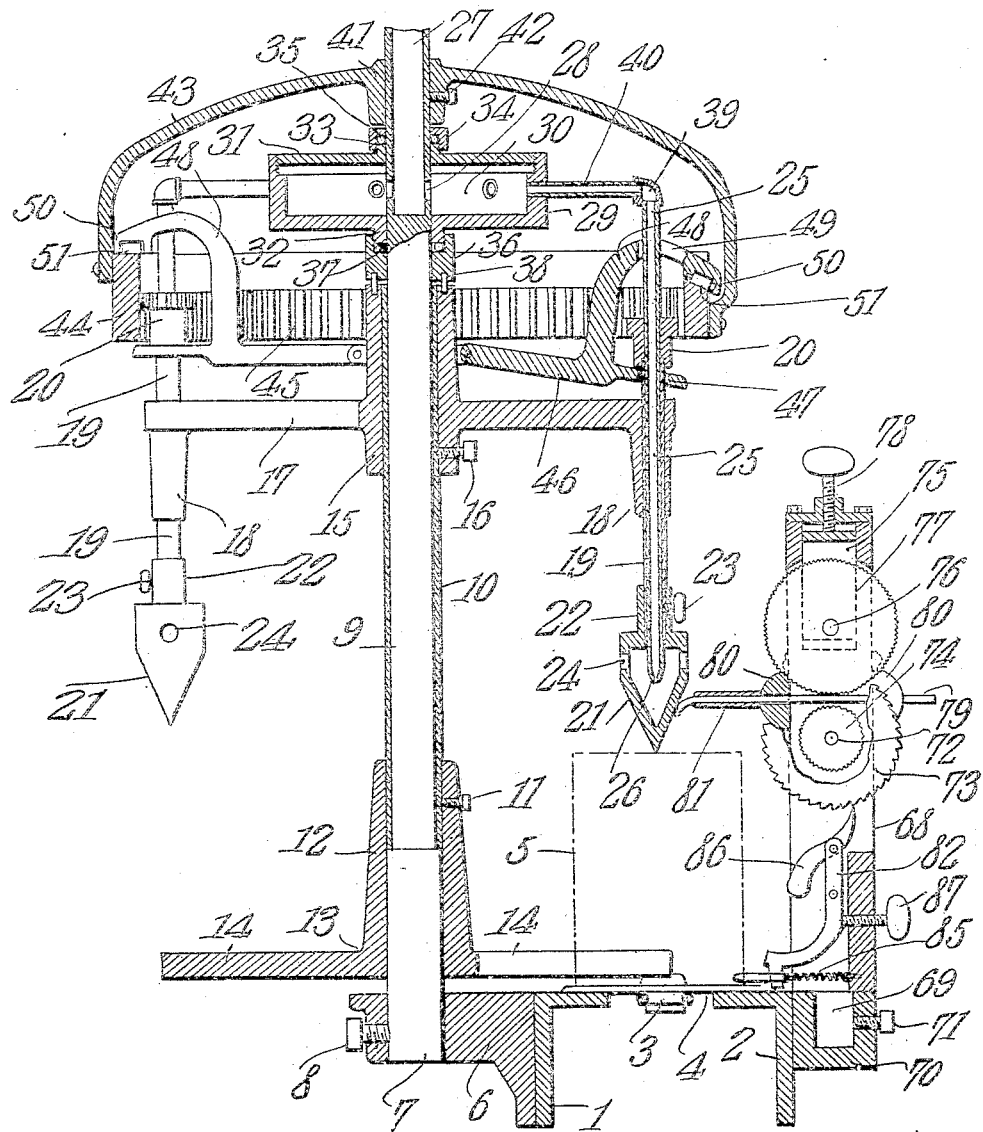

E. C. DICKEY.
CAN VENT SOLDERING MACHINE.
APPLICATION FILED MAR. 19, 1909.
957,147.
Patented May 3, 1910.
3 SHEETS—SHEET 2.
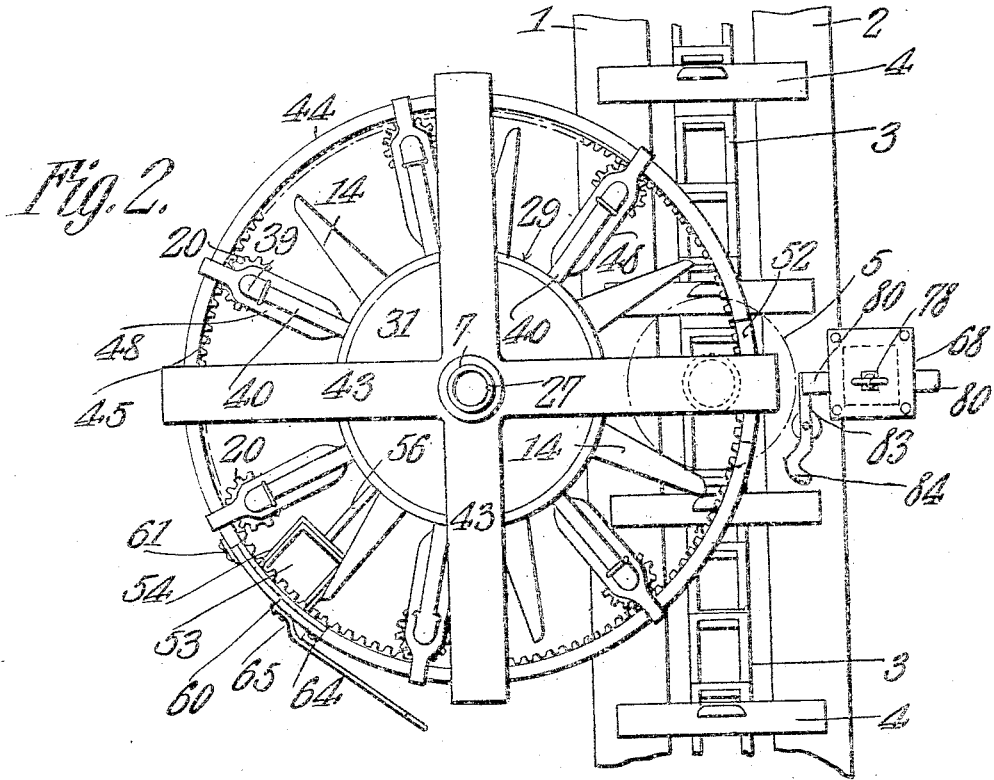
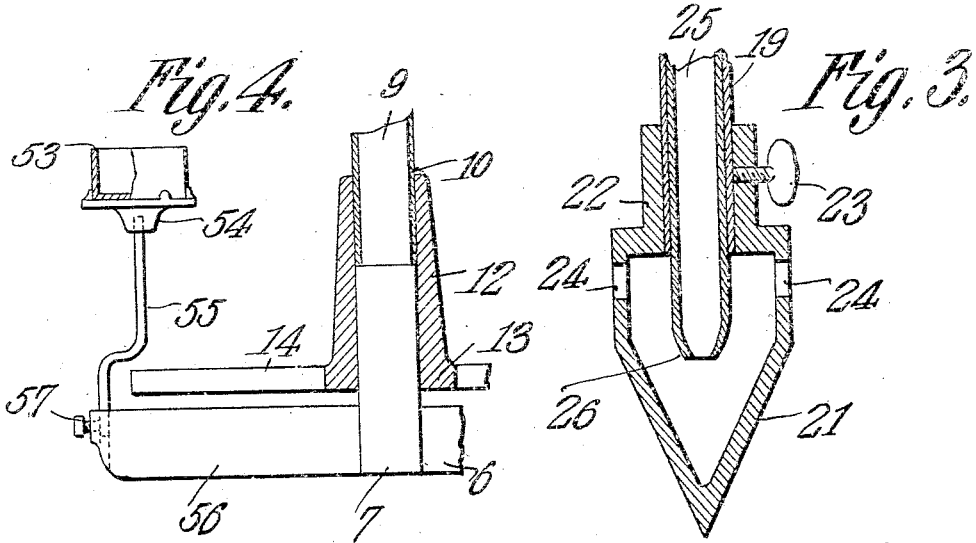
Witnesses
E. J. Stewart
F. J. Chapman
Inventor
Elmer C. Dickey.
By C. A. Snow & Co.
Attorneys E. C. DICKEY.
CAN VENT SOLDERING MACHINE.
APPLICATION FILED MAR. 19, 1909.
957,147.
Patented May 3, 1910.
3 SHEETS—SHEET 3.
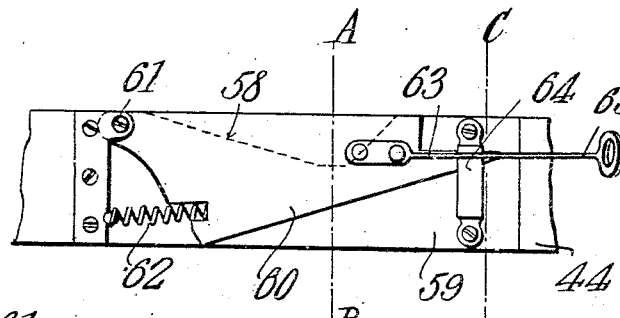
Fig. 5.
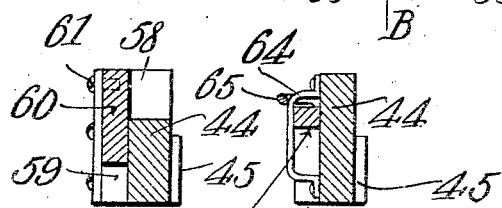
Fig. 6.   Fig. 7.
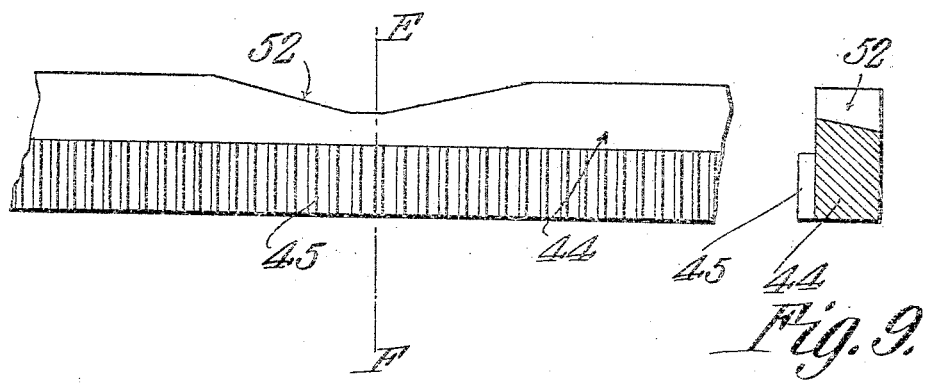
Fig. 8.
Fig. 9.
Witnesses
Inventor
Elmer C. Dickey.
By C. A. Snow & Co.
Attorneys

UNITED STATES PATENT OFFICE.

ELMER C. DICKEY, OF KOKOMO, INDIANA.

CAN-VENT-SOLDERING MACHINE.

957,147.        Specification of Letters Patent.        Patented May 3, 1910.

Application filed March 19, 1909. Serial No. 484,492.

*To all whom it may concern:*

Be it known that I, ELMER C. DICKEY, a citizen of the United States, residing at Kokomo, in the county of Howard and State of Indiana, have invented a new and useful Can-Vent-Soldering Machine, of which the following is a specification.

This invention has reference to improvements in can vent soldering machines and its object is to provide an automatically operated device for applying solder to the vents of a can containing material to be preserved so as to hermetically seal said can, the said soldering of the vent completing the operation of sealing the goods within the can.

In accordance with the present invention the cans after receiving the material to be preserved, and after having the top applied and having been subjected to any other treatment prior to the final sealing, are delivered to the structure forming the subject matter of the present invention and by the operation of feeding the cans to the present machine cause the actuation of the present machine to apply a small quantity of solder to the vent in the cover of a can to finally complete the sealing thereof.

In the preferred form of the invention there is provided a circular rotatable series of soldering irons or coppers which are brought one after the other in regular sequence into operative engagement with the respective ones of a passing series of cans and each iron or copper brings a drop of solder into engagement with the metal of the cover of the can at the vent and deposits sufficient solder thereon to close the vent and so to seal the can. The coppers are kept at the proper heat by means of burning fluid internally applied thereto and provision is made for the application of solder to the soldering iron prior to its movement into engagement with the can, the solder being applied preferably in the string form and in regulated quantity both for the appearance of the finished job and for economical reasons. Furthermore, provision is made by the present invention for a suitable movement of the soldering coppers when in engagement with the cans to cause the distribution and uniting of the solder with all parts of the vent and the deposition of sufficient solder to surely close the vent. The operation of soldering the cans and of feeding the solder is entirely automatic being under the control of the oncoming cans to be sealed, but since it is advisable to occasionally treat the soldering coppers with a suitable flux or cleansing fluid the invention also includes a manually operated means for causing the coppers at any desired time to be treated at their points with a bath of suitable fluid. While this operation could be automatic it is preferred that it be at the volition of the operator.

The invention will be best understood from a consideration of the following detail description taken in connection with the accompanying drawings forming a part of this specification, in which drawings:—

Figure 1 is a central section with parts in elevation of the vent soldering machine. Fig. 2 is a plan view thereof. Fig. 3 is a central section on an enlarged scale of one of the soldering coppers shown in Fig. 1. Fig. 4 is a detail view showing partly in elevation and partly in section the cleansing bath receptacle and some of the adjacent parts. Fig. 5 is a detail view of a portion of the track used in the machine with a manually operated gate for permitting the soldering coppers to be dipped into the cleansing bath. Fig. 6 is a cross section on the line A—B of Fig. 5. Fig. 7 is a cross section on the line C—D of Fig. 5. Fig. 8 is a detail view of a portion of the track for supporting the soldering coppers and showing a depression therein for permitting the coppers to move into engagement with the can. Fig. 9 is a cross section on the line E—F of Fig. 8.

Referring to the drawings, there are shown two opposed track members 1 and 2 upon which travels a conveyer chain 3 having spaced cross pieces 4 for engaging cans indicated in dotted lines at 5. The track and chain need not differ materially or at all from the tracks and conveyer chains for cans as used in existing forms of can handling machines and the invention is applicable to various types of machines wherein the canned goods are subjected to the necessary treatment preparatory to the final sealing of the can at the vent. It is at this point that the present invention applies.

Fast upon one of the tracks, say the track 1, is a bracket 6 and this bracket carries a post 7 which may be secured thereto by a set screw 8. After extending a distance above the bracket 6 the post 7 is reduced in diameter as shown at 9 and to this reduced portion 9 there is applied a sleeve 10 which is free to turn thereon. Secured to the lower end of the sleeve 10 by means of a set screw or a number of set screws 11 is the elongated hub 12 of a star wheel 13, the arms 14 of which radiate from the lower end of the hub and this hub is of such length as to extend along that portion of the post 7 of larger diameter until within close relation to the bracket 6 so that the arms 14 radiate in a horizontal plane and are capable of moving over the track section 11 in close relation thereto. These arms are of such length as to be engaged by a can 5 moving along the track so as to cause the rotation of the star wheel 13 by the successive engagement of the cans 5 with the respective arms 14 as the series of cans are moved along the tracks 1—2.

The upper end of the sleeve 10 has secured to it an elongated hub 15 by means of one or more set screws 16, and from the hub 15 there radiate a number of arms 17 each terminating in a downwardly extending neck 18 through which as well as through the respective arms there is formed a vertical passage for a purpose which will presently appear. Extending through each passage in each arm 17 and neck 18 is a tube or pipe 19 carrying at the upper end above the respective arms 17 a pinion 20, being connected to the neck of the pinion by being screwed thereto. Of course other means of connecting the pipe and pinion together may be used. To the lower end of the tube 19 there is secured a soldering copper 21 provided at its base end with a neck 22 receiving the tube 19 and this neck carries a thumb screw 23 by means of which the soldering copper is removably connected to the tube 19. The head of the soldering copper is made hollow and near the butt end thereof are a number of perforations 24 connecting the interior of the soldering copper with the external air. Extending entirely through the tube 19 is a pipe 25 entering the interior of the head 21 of the soldering copper and there provided with a suitable nozzle 26. This pipe 25 extends also upwardly through the pinion 20 and for a distance above the same for a purpose which will presently appear. The exterior diameter of the pipe 25 is somewhat less than the interior diameter of the pipe 19 so that there is no material frictional engagement between the two pipes and the pipe 19 may freely move longitudinally on the pipe 25.

The upper end of the reduced portion 9 of the post 7 above the sleeve 10 is made hollow as indicated at 27 and near the lower end this hollow portion has its walls perforated as indicated at 28. Surrounding the perforated end of the hollow portion 27 is a drum 29 in which is a chamber 30 closed in by a top 31 screwed into said drum and both the drum 29 and the top 31 are formed with axial, externally threaded necks 32 and 33 respectively, through which necks the post 7 extends. The neck 33 receives a gasket 34 confining packing 35 to the neck 33 and the neck 32 receives a gasket 36 confining packing 37 thereto. The gasket 36 is connected to the hub 15 at the upper end thereof by means of pins 38 so that the gasket and drum 29 are supported by the hub 15 and constrained to rotate therewith by means of the pins 38.

The upper end of each pipe 25 is connected by an ell 39 to a pipe 40 radiating from and communicating with the interior of the drum 29. By this means the chamber 30 is in constant communication with the pipes 25 and nozzles 26, so that gas or burning fluid entering through the hollow section 27 of the post 7 will find its way into the chamber 30 through the perforations 28 and ultimately into the pipes 25 through the short connecting pipes 40 and will finally discharge through the nozzles 26 into the interior of the respective soldering coppers 21. This burning fluid being lighted will readily heat the active ends of the soldering coppers and by the use of a suitable valve (not shown) in the fluid conduit leading to the hollow section 27 the degree of heat generated in the soldering coppers may be definitely determined. The drum 29 is caused to rotate with the soldering coppers and the supports therefor but the joints between the drum 29 and the section of the post 7 which the drum immediately surrounds are made fluid tight by the packing provided.

Secured to the hollow section 27 of the post 7 above the drum 29 is a hub 41, made fast to the said hollow section 27 by one or more set screws 42. From this hub radiate a number of arms 43 curved downward in the form shown in Fig. 1, and there carrying at the free ends a circular track 44, on the lower portion of the inner face of which is formed a continuous series of gear teeth 45, constituting a circular rack. This rack is engaged by the pinions 20 and, the rack being stationary, the pinions are caused to rotate when the arms 17 are rotated by the engagement of the cans 5 with the arms 14 of the star wheel 13.

Pivotally connected to the hub 15, or if desired to each arm 17 is an arm 46 extending over and substantially parallel to the respective arms 17. The outer end of each arm is provided with a perforation 47 through which extends a tube 19 and engaging with the upper surface of the arm 47 at the outer end thereof is the respective one of the pinions 20. Each arm 46 has rising from it between its pivoted end and where it is traversed by the pipe 19 an extension 48 having its free end curved so as to overhang the outer end of the arm 46. The curved portion of the extension 48 is provided with an elongated slot 49 for the passage of the pipes 25 without engaging the said extension 48. The outer or free end of the extension 48 is formed with ears 50 for the reception of the spindle of a roller 51, which roller engages with the upper edge of the track 44, which latter upholds the arm 46 through the roller and extension 48, and so sustains the weight of the soldering copper 21 with its tube 19 and pinion 20. The soldering coppers travel in a circular path about the axis of the arms 17 and the cans travel in a straight path so that the vents move in a path tangential to the path of the points of the soldering coppers. Where these two paths meet the track 44 is provided on its upper surface with a depression 52 best shown in Fig. 8. When the roller 51 of any of the extensions 48 of an arm 46 reaches the depression 52 it will ride down the walls thereof and the weight of the soldering copper will cause the latter to fall a proportionate distance due to the turning of the arm 46 on its pivot under the action of the weight of the soldering copper. While the arm 46 moves about a pivot and so its outer end describes an arc the soldering copper is constrained to move in a vertical line because the tube 19 is guided in the neck 18. The extent of movement of the soldering copper in a vertical direction is sufficient to bring its point into contact with the can at the vent therein, and assuming that the soldering copper is sufficiently heated and that it is supplied with melted solder then a drop of solder is deposited at the vent hole of the can and the latter is suitably sealed. As the soldering coppers are rotated about the axis of the arms 17 the pinions 20 are maintained in engagement with the circular rack 45 and consequently the coppers are also rotated about their own axes so that they have an axial and an orbital rotation. Consequently when the soldering copper is brought into operative relation to the vent hole of a can it is momentarily held in engagement therewith and at the same time given a rotative movement about its own axis so as to distribute the solder and thoroughly heat the adjacent portions of the can so as to cause a firm uniting of the solder with all parts of the walls of the vent hole. By this means the vent hole is very effectively closed.

It becomes necessary from time to time to clean the points of the soldering coppers. For this purpose there is provided at some convenient point in the path of the travel of the coppers a receptacle 53 which may conveniently be supported upon a stand 54 upheld by a stem 55 held to an arm 56 projecting from the bracket 6 by a set screw 57. The receptacle 53 may contain a quantity of any suitable acid or flux used for the purpose of cleaning the points of the soldering coppers.

At an appropriate point in the track 44 there is formed a depression 58 best shown in Fig. 5 where it is indicated by dotted lines. At this point the track may be thinned by a suitable recess on one face as indicated at 59 and in this recess is seated a gate 60 having a hinge connection at one end to the corresponding end wall of the recess indicated at 61, and this gate is urged in an upward direction by a spring 62 so that normally the upper edge of the gate is coincident with the active or top surface of the track. The end of the gate remote from its hinge is formed with a tongue 63 extending through a guiding yoke 64 fast on the side of the track within the recess 59. The gate 60 is moved against the action of the spring 62 by means of a handle 65 within reach of the operator. When the handle 65 is properly manipulated it will carry the gate downward about its hinge 61 in opposition to the action of the spring 62, thus permitting the rollers 51 to drop into the recess 58 when they reach the latter and the soldering coppers then gravitate a corresponding distance downward. Since the vessel 53 is appropriately located the descending coppers will be plunged into the fluid within the vessel 53 point first to a depth agreeable to the extent of the depression 58 into the track 44. By omitting the gate 60 the coppers would always at some point in their rotation be dipped into the cleaning fluid, but as such oft repeated dipping is unnecessary the gate is supplied so that the coppers are prevented from being dipped into the cleaning fluid except at the volition of the operator who has but to depress the pedal 67 to open the gate and cause the coppers one after another and as many as desired and as many times as desired to be dipped into the cleaning fluid. As soon as the pedal is released the spring 62 will cause the gate to return to its initial position and this spring is amply strong to overcome the weight of a copper and its coacting parts.

It is desirable that suitable solder should be fed to the soldering coppers in predetermined quantity at the proper time interval before the operation of the soldering iron or copper. For this purpose there is provided the structure shown in Fig. 1. This solder feeder consists of a suitable post or support or frame work 68 which may be made up of two spaced plates secured together. In the drawing one of the two plates has been omitted to expose the parts housed between them, but it will be understood that this part of the structure may be variously formed to carry the operating parts, and at best is merely a supporting framework. The lower end of the support 68 is formed with a stud 69 entering a socket in a bracket 70 fast on the track section 2 and there held by a set screw 71.

At an appropriate point in the frame 60 there is journaled a short shaft 72 on which is secured a ratchet wheel 73 and a small roller 74, the periphery of which may be milled or otherwise roughened for a purpose which will presently appear. The upper end of the support or framework 68 is suitably shaped to receive a sliding block 75 carrying the shaft or pintle 76 of a roller 77, the periphery of which may be milled or otherwise roughened like that of the roller 74. A thumb screw 78 is mounted in the upper end of the frame or support 68 and serves to force the block 75 and the roller 77 in a direction toward the roller 74, these two rollers being in the same vertical plane, while the ratchet wheel 73 is to one side of the vertical plane of the two rollers. The rollers 74 and 77 are designed to grasp between them a strand of string or ribbon solder 79 and this solder may be if desired of a type containing an appropriate quantity of flux so as to cause it to adhere readily both to the soldering copper and to the walls of the vent hole of the can when brought into contact therewith in a melted condition. In order that the solder strand may be suitably guided there are provided blocks 80 on opposite sides of the frame or support 68 in the path of travel of said solder, and these blocks may be suitably shaped to guide the solder toward the soldering coppers. Furthermore, the block 80 adjacent to the soldering coppers may be provided with a tubular extension 81 through which the strand of solder is guided until in close relation to the soldering copper.

In the lower portion of the frame 68 there is pivoted a lever 82 the lower end of which projects laterally from the frame at substantially right angles to the direction of the travel of the cans 5. The lever 82 is controlled by another lever 83 movable about a vertical pivot and having its free end 84 appropriately bent to normally be in the path of the cans 5 so that when engaged by the latter it will be moved in a direction to actuate the lever 82 against the tendency of a spring 85 connected to the lever 83 and tending to maintain its end 84 always within the path of the cans 5. The end of the lever 82 remote from that controlled by the lever 83 carries a gravity pawl 86 in engagement with the teeth of the ratchet wheel 73. Of course a spring pawl might be used in place of a gravity pawl, but the gravity pawl is found to answer the purpose and also saves the use of an additional spring. The extent of movement of the lever 82 may be controlled by an adjusting thumb screw 87. When a can 5 engages the lever 83 in a manner to operate the same the lever 82 is rocked on its pivot to an extent to carry the pawl 86 in a direction to move the ratchet wheel 73 in an active sense. When the pressure of the can on the lever 83 is removed by the passing of the can beyond the lever, then the spring 85 becomes active to return the parts to normal position and the pawl 86 will move over one or more teeth of the ratchet wheel, depending on the position of the adjusting screw 7. By this means a definite amount of solder may be fed on the passing of the cans by the lever 83, and this amount of solder may be adjusted within the limits of the size of the teeth of the ratchet wheel 17 and the extent of movement of the adjusting screw 7.

The invention thus provides a means whereby a moving series of cans in properly spaced relation one to the other will engage the arms 14 and so impart rotative movement to the hub 13 and to the sleeve 12, thence to the sleeve 15 and the arms 17 carrying the soldering coppers, while at the same time the coppers are given rotative movement about their individual axes. The coppers are maintained at the proper heat by means of the burning fluid constantly supplied through the pipes 25 and nozzles 26, the flame being interior to the point of the soldering copper and so having no oxidizing or other deleterious effects upon the solder. As the soldering coppers approach the cans each copper is first brought into engagement with the solder being fed by the solder feeding apparatus and an appropriate amount of solder is melted off and flows down to the point of the soldering copper under consideration. The depression 52 of the track 44 being now in the path of the roller of the particular arm 46 supporting the soldering copper under consideration the same copper is permitted to drop on to the can and the point engages the can at the vent hole. The solder is distributed immediately around the vent hole by the axial rotation of the soldering copper and for a very short time interval the travel of the can and of the soldering copper are so nearly in the same line that for all practical purposes the point of the soldering copper while in contact with the can rotates in coincidence with the vent hole. As soon as the paths of the soldering copper and the can begin to diverge the rising side of the depression 52 is reached and the copper is elevated from engagement with the can. In the meantime the next succeeding soldering copper is approaching the next succeeding can and its arm 46 has the corresponding roller 50 moving into operative relation to the depression 52 so that the second soldering copper under consideration is brought into engagement with the second can and the soldering of the vent hole of said second can proceeds as described with relation to the first can, the solder having been fed into operative relation to the second soldering copper in the meantime. So the operation continues from can to can in succession and automatically, the cans themselves serving as the actuating means for the soldering mechanism. From time to time the operator opens the gate 60 to cause the soldering irons to dip into the cleaning fluid, but this operation has already been described and need not be repeated.

What is claimed is:—

1. In a can vent soldering machine, a circular series of soldering irons or coppers having both orbital and axial rotation, a circular track having at one point a constantly active depression, means coacting with the track for maintaining the soldering coppers in an elevated position except at the depression in the track, a conveyer for cans having a straight path past the series of coppers tangent to the path of the points of the latter coincident with the depression in the track, and means actuated by cans upon the conveyer for causing rotation of the series of coppers.

2. In a can vent soldering machine, a circular series of soldering irons or coppers having both orbital and axial rotation, a circular track having at one point a constantly active depression and provided with a circular series of gear teeth on the inner face, means coacting with said track for maintaining the soldering coppers in an elevated position except at the depression in the track, pinions, one for each soldering copper, said pinions being connected positively to each copper in constant engagement with the circular series of gear teeth or rack, a conveyer for cans having a straight path past the series of coppers and tangent to the path of the points of the latter coincident with the depression in the track, and means actuated by the cans upon the conveyer for causing the rotation of the series of coppers.

3. In a can vent soldering machine, a circular series of soldering irons or coppers having both orbital and axial rotation, a circular track having at one point a constantly active depression and at another point another depression, a manually operable gate for normally maintaining the second depression in the track inactive, means coacting with the track for maintaining the soldering coppers in an elevated position except at the active depression in the track and responsive to the second named depression when the latter is active, a conveyer for cans having a straight path past the series of coppers and tangent to the path of the points of the latter coincident with the depression in the track which is constantly active, and means actuated by the cans upon the conveyer for causing the rotation of the series of coppers.

4. In a can vent soldering machine, a circular series of soldering irons or coppers having both orbital and axial rotation, a circular track having at one point a constantly active depression, means coacting with the track for maintaining the soldering coppers in an elevated position except at the depression in the track, a conveyer for cans having a straight path past the series of coppers and tangent to the path of the points of the latter coincident with the depression in the track, means actuated by the cans upon the conveyer for causing rotation of the series of coppers, and means also actuated by the cans upon the conveyer for causing the feeding of solder to the soldering coppers.

5. In a can vent soldering machine, a circular series of soldering irons or coppers having both orbital and axial rotation, a circular track having at one point a constantly active depression and at another point a normally inactive depression, manually operable means for maintaining the second named depression in the normally inactive condition and capable of rendering the said second named depression active, means coacting with the track for maintaining the soldering coppers in an elevated position except at the depression in the track which is normally active and also responsive to the second named depression when the latter is active, means coincident with the second named depression for applying cleaning fluid to the soldering coppers, a conveyer for the cans having a straight path past the series of coppers and tangent to the path of the points of the latter coincident with the first named depression in the track, means actuated by the cans upon the conveyer for causing the rotation of the series of coppers, and means actuated by the cans for feeding solder to the coppers.

6. In a can vent soldering machine, a circular series of soldering irons or coppers having orbital and axial rotation, means for supplying heat to the soldering coppers terminating within the latter and participating in the orbital movement of said coppers, and means for causing longitudinal axial movement of the coppers independent of the means for supplying the heat.

7. In a can vent soldering machine, a circular series of soldering irons or coppers having orbital and axial rotation, a pipe for supplying heat to each soldering copper and extending to and terminating within the interior thereof, and means for causing longitudinal axial movement of the coppers independent of the pipe for supplying the heat.

8. In a can vent soldering machine, a circular series of hollow soldering irons or coppers, a tubular support for each copper, a pinion fast on the tubular support at the end remote from the copper, a guide for the tubular support permitting longitudinal movement thereof, a supply pipe for heating fluid extending through the tubular support and into and terminating within the hollow head of the copper, a circular track having its continuity broken by a depression and also having on its inner face a circular rack or series of gear teeth, engaged by the pinion of each copper, and a support for each copper upheld by the track and in turn holding said copper.

9. In a can soldering machine, a post or support, a rotatable sleeve thereon, a rotatable series of spaced radial arms carried by one end of the sleeve, a series of radial arms carried by the other end of the sleeve and each terminating in a guiding neck, a tube in each neck on the last named arms and movable longitudinally therein, a pinion carried by one end of each tube, a hollow soldering iron or copper carried by the other end of each tube, a fixed circular track having a depression in its continuity and provided on its inner face with a circular rack or series of gear teeth, said gear teeth being engaged by the pinions on the upper ends of the tubes carrying the soldering coppers, a distributing drum for a heating medium mounted on the post and connected to the radial arms for rotation therewith, fluid conveying pipes connected to said distributing drum and extending axially through the tubular support and into the hollow coppers, and a carrier for the coppers comprising arms underriding the pinions to uphold the tubes and coppers at the other end thereof, said arms being provided with extensions overhanging the pinions and engaging the track and adapted to move into the depression therein to permit the gravitating of the soldering coppers in a direction away from the track.

10. In a can soldering machine, a circular series of soldering irons or coppers, a track for holding the coppers in a normally elevated position and provided with a depression for permitting the coppers to fall at the point of depression in the track, a receptacle for a cleansing fluid or flux coincident with said depression, a gate for said depression having a normal tendency toward a position for maintaining the normal continuity of the track, and means for moving the gate against its normal tendency to a position to render the depression active.

11. In a can soldering machine, a circular series of soldering irons or coppers having an orbital movement and also movable in the direction of their axes, a circular track for maintaining the soldering coppers in an elevated position, said track being provided at one point with a depression and reduced in thickness coincident with said depression, a gate located in said depression and pivotally supported at one end, a spring normally maintaining the gate in a position to render the track continuous and the depression inactive, and means for moving said gate to a position rendering the depression active, at the will of the operator.

In testimony that I claim the foregoing as my own, I have hereto affixed my signature in the presence of two witnesses.

ELMER C. DICKEY.

Witnesses:
A. W. SMITH,
FRED SANDERS.